US011248573B2

(12) United States Patent
Akiyama et al.

(10) Patent No.: US 11,248,573 B2
(45) Date of Patent: Feb. 15, 2022

(54) HIGH-PRESSURE FUEL PUMP

(71) Applicant: Hitachi Automotive Systems, Ltd., Hitachinaka (JP)

(72) Inventors: Moritsugu Akiyama, Hitachinaka (JP); Satoshi Usui, Hitachinaka (JP); Hiroyuki Yamada, Hitachinaka (JP); Shigehiko Omata, Hitachinaka (JP); Masashi Nemoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 45 days.

(21) Appl. No.: 16/627,921

(22) PCT Filed: Jun. 25, 2018

(86) PCT No.: PCT/JP2018/023945
§ 371 (c)(1),
(2) Date: Dec. 31, 2019

(87) PCT Pub. No.: WO2019/012970
PCT Pub. Date: Jan. 17, 2019

(65) Prior Publication Data

US 2020/0132029 A1 Apr. 30, 2020

(30) Foreign Application Priority Data

Jul. 14, 2017 (JP) ............................. JP2017-137638

(51) Int. Cl.
*F02M 59/46* (2006.01)
*F02M 59/02* (2006.01)
(Continued)

(52) U.S. Cl.
CPC ........ *F02M 59/462* (2013.01); *F02M 59/025* (2013.01); *F02M 59/46* (2013.01);
(Continued)

(58) Field of Classification Search
CPC .. F02M 59/462; F02M 63/0036; F02M 59/46; F02M 63/0077; F02M 59/485;
(Continued)

(56) References Cited

U.S. PATENT DOCUMENTS 5,374,167 A * 12/1994 Merbold ............... B60T 8/4031 137/316
6,375,158 B1 * 4/2002 Kramer ..................... F01L 3/10 251/336
(Continued)

FOREIGN PATENT DOCUMENTS

DE 10 2014 212 631 A1 10/2015
EP 0 994 255 A1 4/2000
(Continued)

OTHER PUBLICATIONS

International Search Report (PCT/ISA/210) issued in PCT Application No. PCT/JP2018/023945 dated Oct. 16, 2018 with English translation (three (3) pages).
(Continued)

*Primary Examiner* — Dominick L Plakkoottam
(74) *Attorney, Agent, or Firm* — Crowell & Moring LLP

(57) ABSTRACT

Provided is a high-pressure fuel pump that ensures oil tightness even at high fuel pressure and has a small and lightweight inexpensive discharge valve structure. Therefore, a high-pressure fuel pump according to the present invention includes: a discharge valve arranged on a discharge side of a pressurizing chamber; a discharge valve seat on which the discharge valve is seated; and a facing member configured independently as a separate member from the discharge valve seat and located on an opposite side of the discharge valve seat with the discharge valve interposed therebetween, in which a stroke direction regulating portion that regulates displacement of the discharge valve in a stroke direction is formed on a tapered surface of the facing member.

11 Claims, 8 Drawing Sheets

(51) Int. Cl.

| | |
|---|---|
| ***F02M 59/48*** | (2006.01) |
| ***F02M 63/00*** | (2006.01) |
| ***F04B 1/0452*** | (2020.01) |
| ***F04B 53/10*** | (2006.01) |

(52) U.S. Cl.
CPC ...... *F02M 59/485* (2013.01); *F02M 63/0036* (2013.01); *F02M 63/0077* (2013.01); *F04B 1/0452* (2013.01); *F04B 53/1002* (2013.01); *F04B 53/1007* (2013.01)

(58) Field of Classification Search
CPC ............. F02M 63/005; F02M 63/0054; F02M 63/0075; F02M 63/0078; F02M 63/0225; F02M 63/0245; F02M 2200/50; F02M 59/02; F02M 59/025; F04B 43/06; F04B 49/246; F04B 53/1002; F04B 53/1007; F04B 1/0452; F16K 15/044; F16K 17/0406; F16K 17/0433
See application file for complete search history.

(56) References Cited

U.S. PATENT DOCUMENTS

| | | | | |
|---|---|---|---|---|
| 9,828,959 | B2 * | 11/2017 | Teike | F02M 63/0054 |
| 2007/0068580 | A1 * | 3/2007 | Van Der Linden | F16K 15/044 137/539 |
| 2008/0292473 | A1 * | 11/2008 | Marino | F16K 15/044 417/38 |
| 2009/0110575 | A1 * | 4/2009 | Munakata | F02M 59/48 417/437 |
| 2009/0116987 | A1 | 5/2009 | Oota | |
| 2010/0116364 | A1 * | 5/2010 | Koyama | B60T 17/04 137/535 |
| 2016/0169174 | A1 * | 6/2016 | Teike | F02M 63/0054 137/539 |
| 2017/0159629 | A1 * | 6/2017 | Teike | F02M 63/0036 |
| 2017/0321646 | A1 * | 11/2017 | Teike | F02M 63/0054 |

FOREIGN PATENT DOCUMENTS

| | | | |
|---|---|---|---|
| JP | 2008-106620 | A | 5/2008 |
| JP | 2009-531577 | | 9/2009 |
| JP | 2011-80391 | A | 4/2011 |
| WO | WO 15/163246 | A | 10/2015 |
| WO | WO 2016/098482 | A1 | 6/2016 |

OTHER PUBLICATIONS

Japanese-language Written Opinion (PCT/ISA/237) issued in PCT Application No. PCT/JP2018/023945 dated Oct. 16, 2018 (four (4) pages).

Japanese-language Office Action issued in Japanese Application No. 2019-529033 dated Jun. 16, 2020 with English translation (eight pages).

Extended European Search Report issued in European Application No. 18831886.9 dated Mar. 9, 2021 (six (6) pages).

* cited by examiner

HIGH-PRESSURE FUEL PUMP

TECHNICAL FIELD

The present invention particularly relates to a discharge valve structure of a high-pressure fuel pump mainly applied to an internal combustion engine for automobiles.

BACKGROUND ART

Plunger-type high-pressure fuel pumps for increasing the pressure of fuel are widely used in a direct-injection internal combustion engine for automobiles that inject fuel directly into a combustion chamber. As related art of a high-pressure fuel pump, Patent Literature 1 (JP 2011-80391 A) discloses a discharge valve unit that accommodates a valve body, a seat, and a spring. The discharge valve has a flat seat surface, and oil tightness can be obtained by polishing the abutment portion between the valve body and the seat with high accuracy.

In Patent Literature 2 (WO 15/163246 A), there is one using a poppet valve. When the poppet valve receives back pressure and comes in abutment against a seat surface, the poppet valve makes hertz contact with a seat portion, so that oil tightness can be obtained.

CITATION LIST

Patent Literature

PTL 1: JP 2011-80391 A
PTL 2: WO 15/163246 A

SUMMARY OF INVENTION

Technical Problem

However, in Patent Literature 1, since the discharge valve mechanism is a unit type, the space for attaching is large, and an increase in the overall size of the product is required for mounting. On the other hand, in Patent Literature 2, since it is not a unit type, the size of the product can be reduced. However, since the valve body is a poppet valve, the number of processing steps increases, and manufacture at a low cost is difficult.

Accordingly, an object of the present invention is to provide a high-pressure fuel pump including a highly reliable discharge valve mechanism at low cost.

Solution to Problem

In order to solve the above-mentioned problem, according to the present invention, there is provided a high-pressure fuel pump including: a discharge valve arranged on a discharge side of a pressurizing chamber; a discharge valve seat on which the discharge valve is seated; and a facing member configured independently as a separate member from the discharge valve seat and located on an opposite side of the discharge valve seat with the discharge valve interposed therebetween, in which a stroke direction regulating portion that regulates displacement of the discharge valve in a stroke direction is formed on a tapered surface of the facing member.

Advantageous Effects of Invention

According to the present invention, it is possible to provide a high-pressure fuel pump including a highly reliable discharge valve mechanism at low cost. The configurations, operations, and effects of the present invention other than those described above will be described in detail in the following embodiments.

DESCRIPTION OF EMBODIMENTS

Hereinafter, embodiments of the present invention will be described below.

Example

Figure 1:
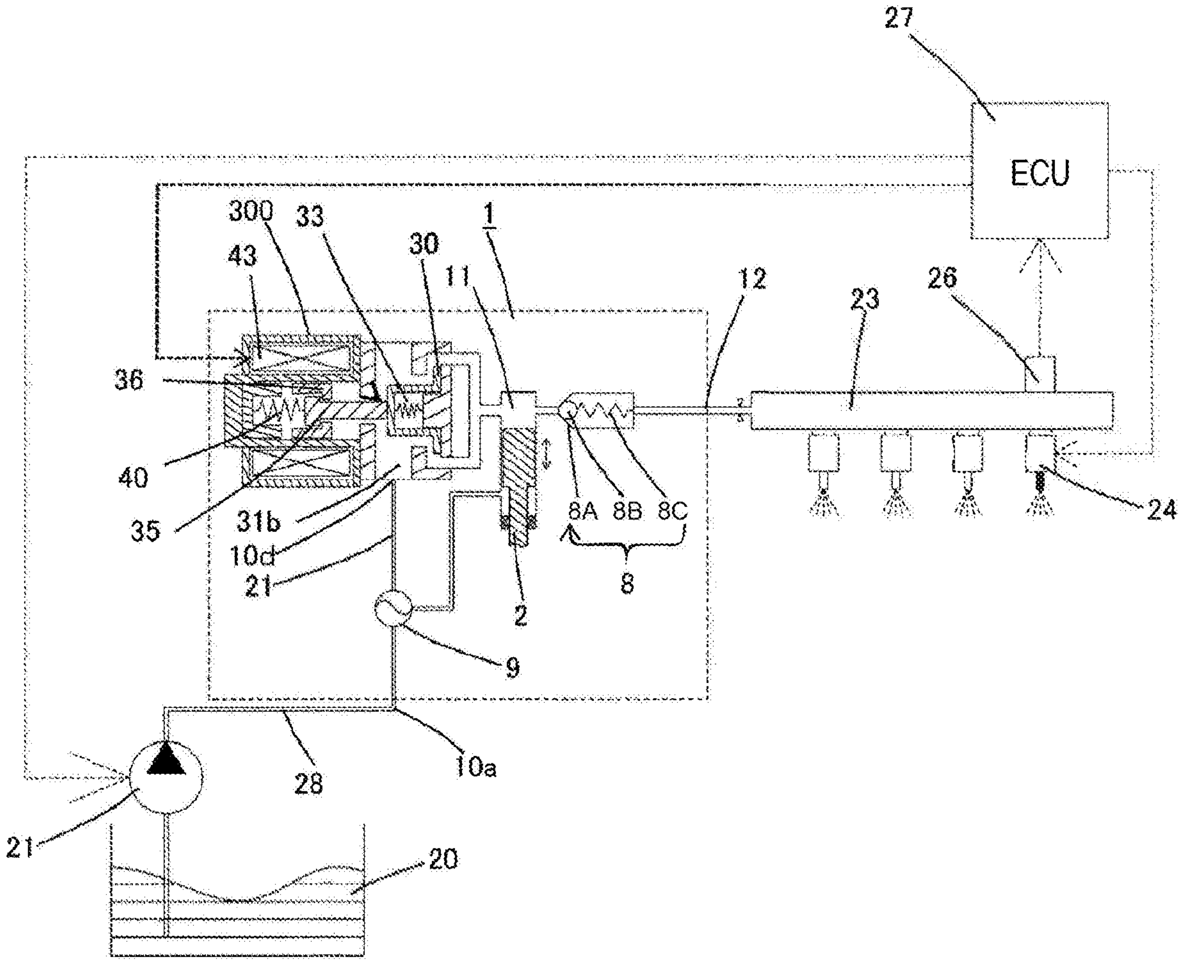
FIG. 1 shows a configuration diagram of an engine system to which a high-pressure fuel pump of the present embodiment is applied.
Figure 2:
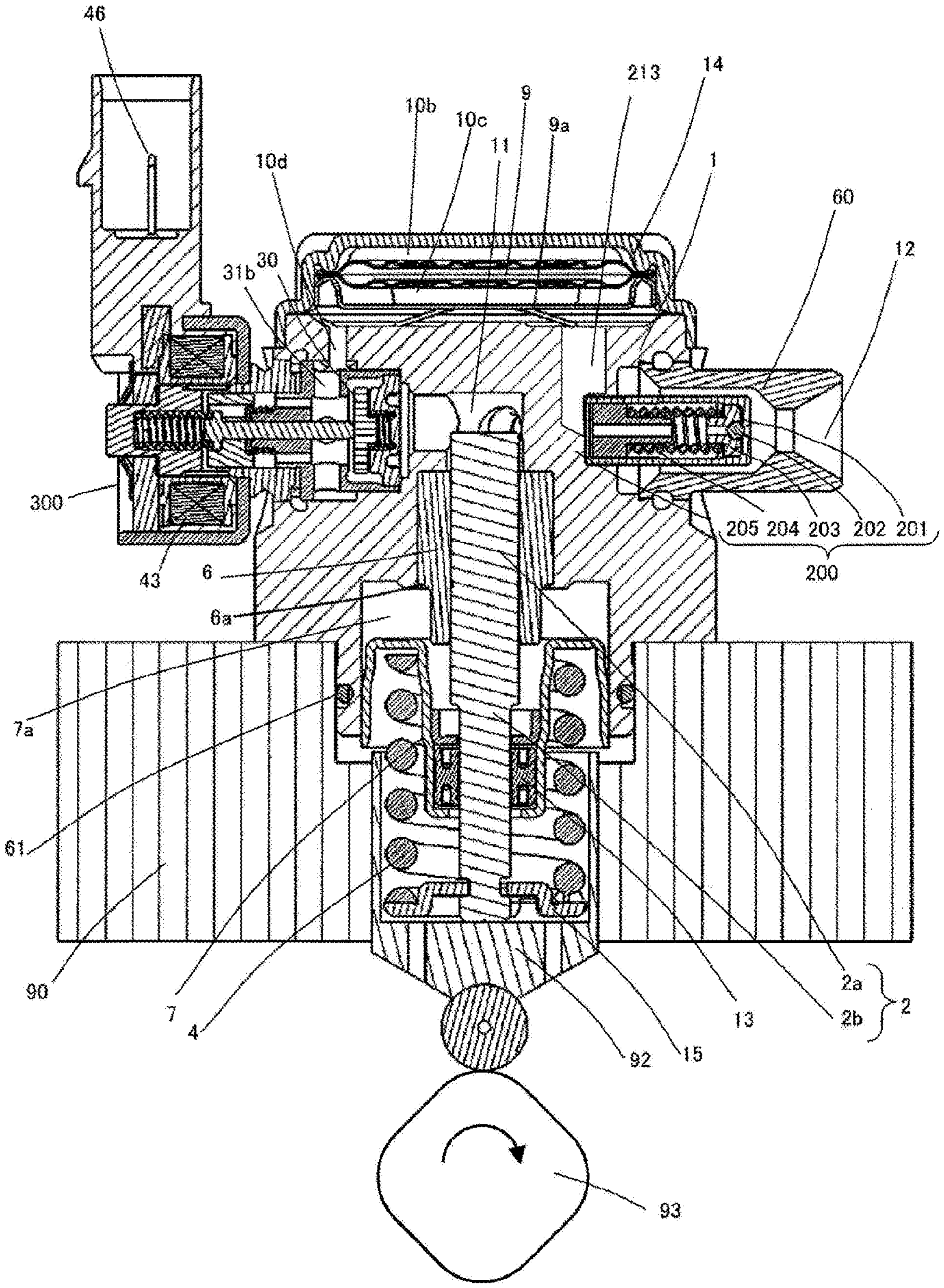
FIG. 2 is a longitudinal sectional view of the high-pressure fuel pump of an embodiment of the present embodiment.
Figure 3:
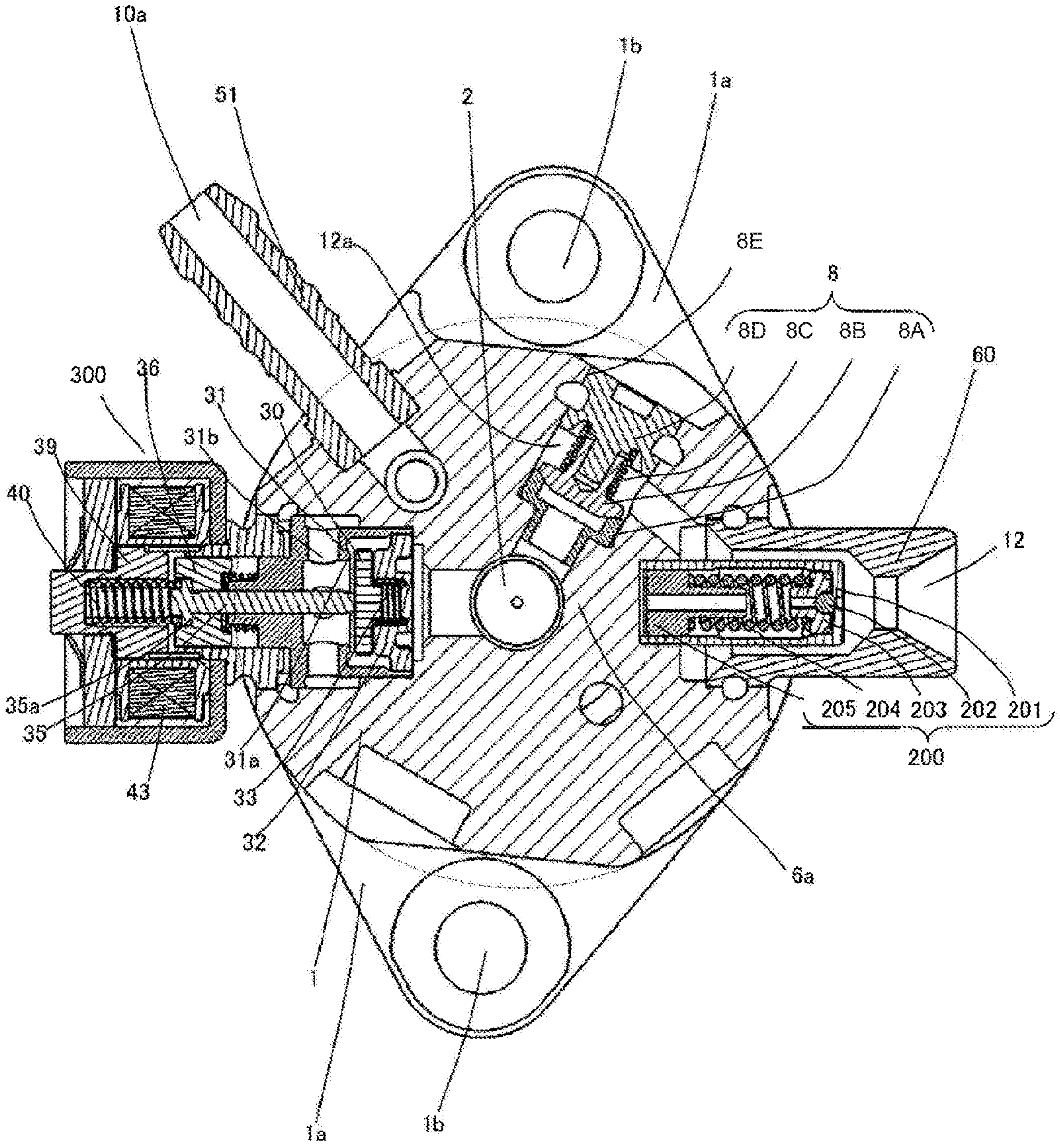
FIG. 3 is a horizontal sectional view of the high-pressure fuel pump of the embodiment of the present embodiment as viewed from above.
Figure 4:
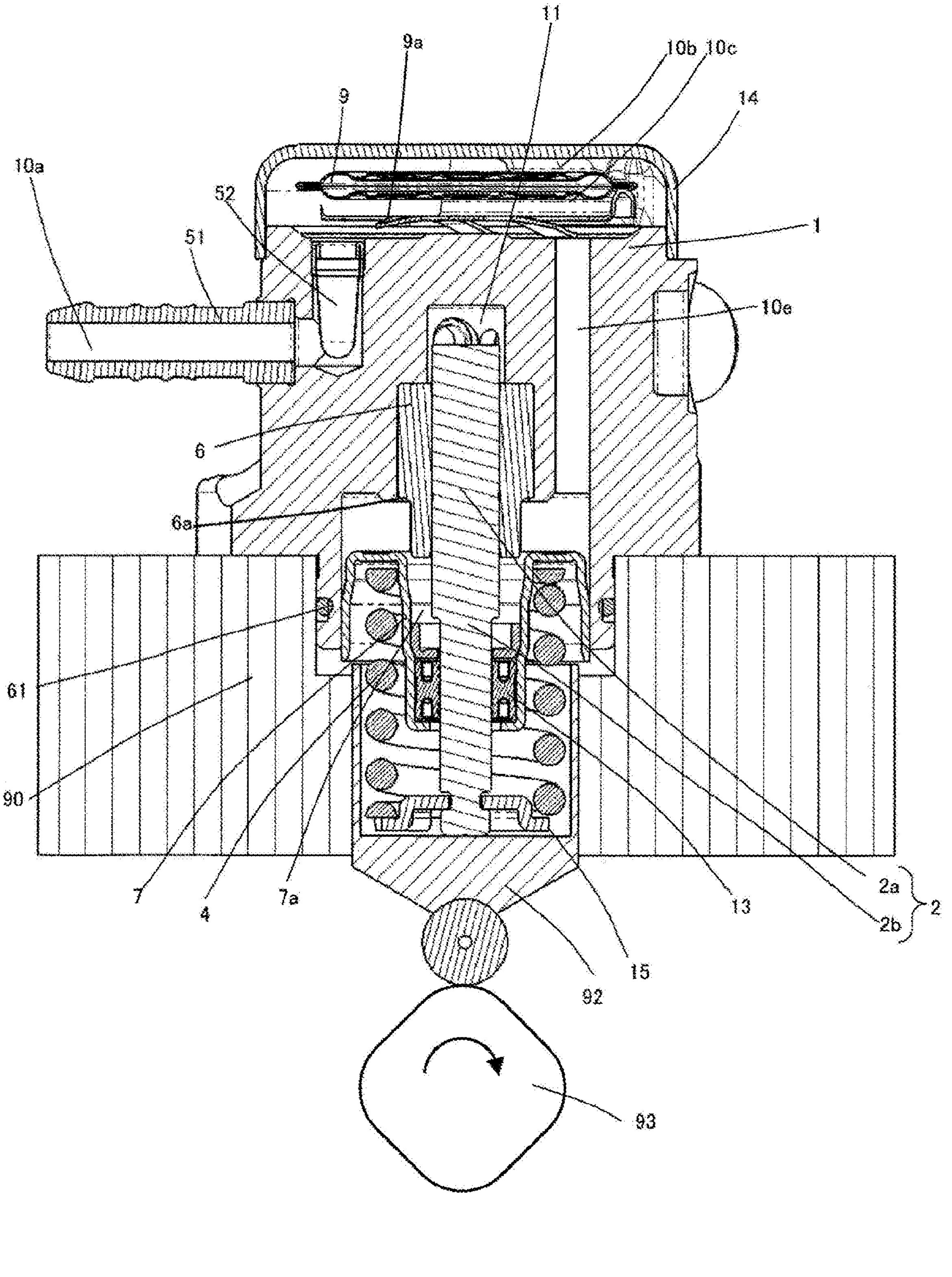
FIG. 4 is a longitudinal sectional view of the high-pressure fuel pump of the embodiment of the present embodiment as viewed from a different direction from FIG. 1.

FIG. 1 shows an overall configuration diagram of the engine system. A portion surrounded by the broken line indicates a main body of the high-pressure fuel pump (hereinafter referred to as a high-pressure fuel pump), and mechanisms/components shown on the inner side of the broken line are indicated as being integrally incorporated with a pump body 1. FIG. 1 is a drawing schematically showing the operation of the engine system, and the detailed configuration may differ from the configuration of a high-pressure fuel pump shown in FIG. 2 and subsequent drawings. FIG. 2 is a longitudinal sectional view of the high-pressure fuel pump of the present embodiment, and FIG. 3 is a horizontal sectional view of the high-pressure fuel pump as viewed from above. Further, FIG. 4 is a longitudinal sectional view of the high-pressure fuel pump as viewed from a different direction from FIG. 2.

The fuel in a fuel tank 20 is pumped up by a feed pump based on a signal from an engine control unit 27 (hereinafter referred to as ECU). This fuel is pressurized to an appropriate feed pressure and sent to a low-pressure fuel inlet port 10*a* of the high-pressure fuel pump through a suction pipe 28.

The fuel that has passed through a suction joint 51 from the low-pressure fuel inlet port 10*a* passes through damper chambers (10*b*, 10*c*) in which a pressure pulsation reduction mechanism 9 is arranged to reach a suction port 31*b* of the solenoid valve mechanism 300 that constitutes a variable capacity mechanism. Specifically, the solenoid valve mechanism 300 constitutes a solenoid intake valve mechanism.

The fuel that has flowed into the solenoid valve mechanism 300 passes through an inlet port that is opened and closed by the inlet valve 30 and flows into a pressurizing chamber 11. Reciprocating motion power is applied to a plunger 2 by a cam mechanism 93 of an engine. Through the reciprocating motion of the plunger 2, fuel from the inlet valve 30 is sucked during a downward stroke of the plunger 2 and the fuel is pressurized during an upward stroke. Via a discharge valve mechanism 8, the pressurized fuel is pumped to a common rail 23 on which a pressure sensor 26 is mounted. Based on a signal from an ECU 27, an injector 24 injects fuel into the engine. The present embodiment is a high-pressure fuel pump applied to a so-called direct injection engine system in which the injector 24 directly injects fuel into a cylinder tube of the engine. The high-pressure fuel pump discharges fuel at a flow rate of desired supply fuel by a signal from the ECU 27 to the solenoid valve mechanism 300.

As shown in FIGS. 2 and 3, the high-pressure fuel pump of the present embodiment is fixed in close contact with a high-pressure fuel pump mounting portion 90 of the internal combustion engine. Specifically, as shown in FIG. 3, a screw hole 1*b* is formed in a mounting flange 1*a* provided in the pump body 1, and a plurality of bolts (not shown) are inserted therein. As a result, the mounting flange 1*a* is brought into close contact with and fixed to the high-pressure fuel pump mounting portion 90 of the internal combustion engine. An O-ring 61 is fitted into the pump body 1 for seal between the high-pressure fuel pump mounting portion 90 and the pump body 1 to prevent engine oil from leaking to the outside.

As illustrated in FIGS. 2 and 4, a cylinder 6 that guides the reciprocating motion of the plunger 2 and forms a pressurizing chamber 11 together with the pump body 1 is attached to the pump body 1. That is, the plunger 2 reciprocates inside the cylinder to change the volume of the pressurizing chamber. The solenoid valve mechanism 300 for supplying fuel to the pressurizing chamber 11 and a discharge valve mechanism 8 for discharging fuel from the pressurizing chamber 11 to the discharge passage are provided.

The cylinder 6 is press-fitted with the pump body 1 on the outer peripheral side thereof. The pump body 1 is formed with an insertion hole for inserting the cylinder 6 from below, and an inner peripheral convex portion is formed to be deformed to the inner peripheral side so as to come in contact with the lower surface of a fixed portion 6*a* of the cylinder 6 at the lower end of the insertion hole. The upper surface of the inner peripheral convex portion of the pump body 1 presses the fixed portion 6*a* of the cylinder 6 upward in the drawing, and the fuel pressurized in the pressurizing chamber 11 at the upper end surface of the cylinder 6 is sealed so as not to leak to the low pressure side.

At the lower end of the plunger 2, there is provided a tappet 92 that converts the rotational motion of the cam 93 attached to a camshaft of the internal combustion engine into vertical motion and transmits it to the plunger 2. The plunger 2 is pressure-bonded to the tappet 92 by a spring 4 through a retainer 15. Thereby, along with the rotational motion of the cam 93, the plunger 2 can be reciprocated up and down.

A plunger seal 13 held at the lower end of the inner periphery of the seal holder 7 is installed in a slidable contact with the outer periphery of the plunger 2 at the lower part of the cylinder 6 in the figure. Thereby, when the plunger 2 slides, the fuel in a sub chamber 7*a* is sealed to prevent the fuel from flowing into the internal combustion engine. At the same time, lubricating oil (including engine oil) that lubricates the sliding portion in the internal combustion engine is prevented from flowing into the pump body 1.

As shown in FIGS. 3 and 4, a suction joint 51 is attached to the side surface of the pump body 1 of the high-pressure fuel pump. The suction joint 51 is connected to a low-pressure pipe that supplies fuel from the fuel tank 20 of the vehicle, and the fuel is supplied from here to the inside of the high-pressure fuel pump. A suction filter 52 serves to prevent foreign matters existing between the fuel tank 20 and the low-pressure fuel inlet port 10*a* from being absorbed into the high-pressure fuel pump by the flow of fuel.

The fuel that has passed through the low-pressure fuel inlet port 10*a* travels to the pressure pulsation reduction mechanism 9 through a low-pressure fuel intake passage that communicates with the pump body 1 shown in FIG. 4 in the vertical direction. The pressure pulsation reduction mechanism 9 is arranged in the damper chambers (10*b*, 10*c*) between a damper cover 14 and the upper end surface of the pump body 1, and is supported from below by a holding member 9*a* arranged on the upper end surface of the pump body 1. Specifically, the pressure pulsation reduction mechanism 9 is a metal damper configured by superposing two metal diaphragms. A gas of 0.3 MPa to 0.6 MPa is sealed inside the pressure pulsation reduction mechanism 9, and the outer peripheral edge is fixed by welding.

The upper and lower surfaces of the pressure pulsation reduction mechanism 9 are formed with the low-pressure fuel inlet port 10*a* and the damper chambers (10*b*, 10*c*) communicating with the low-pressure fuel intake passage. Although not shown in the figure, the holding member 9*a* is formed with a passage communicating the upper side and the lower side of the pressure pulsation reduction mechanism 9.

The fuel that has passed through the damper chambers (10*b*, 10*c*) then reaches the suction port 31*b* of the solenoid valve mechanism 300 via the low-pressure fuel suction passage 10*d* formed in communication with the pump body in the vertical direction.

The suction port 31*b* is formed to communicate with the inlet valve seat member 31 forming an inlet valve seat 31*a* in the vertical direction. The terminal 46 is molded integrally with the connector and the other end can be connected to the engine control unit side.

The solenoid valve mechanism 300 will be described with reference to FIG. 3. When the plunger 2 moves in the direction of the cam 93 due to the rotation of the cam 93 and is in the suction stroke state, the volume of the pressurizing chamber 11 increases and the fuel pressure in the pressurizing chamber 11 decreases. In this process, when the fuel pressure in the pressurizing chamber 11 becomes lower than the pressure in the suction port 31*b*, the inlet valve 30 is opened. When the inlet valve 30 reaches the maximum lift state, the inlet valve 30 comes in contact with the stopper 32. When the inlet valve 30 is lifted, the opening formed in the inlet valve seat member 31 is opened and the valve is opened. The fuel passes through the opening of the inlet valve seat member 31 and flows into the pressurizing chamber 11 through a hole formed in the pump body 1 in the lateral direction.

After the plunger 2 completes the suction stroke, the plunger 2 starts to move upward and moves to the upward stroke. Here, the electromagnetic coil 43 remains in a non-energized state and no magnetic biasing force acts. The rod biasing spring 40 biases a rod protrusion 35*a* that is convex toward the outer diameter side of the rod 35, and is set to have a biasing force necessary and sufficient to keep the inlet valve open in a non-energized state. The volume of the pressurizing chamber 11 decreases with the upward motion of the plunger 2. In this state, the fuel once sucked into the pressurizing chamber 11 is returned again to the suction passage 10*d* through the opening of the inlet valve 30 in the valve open state, and hence the pressure in the pressurizing chamber does not increase. This stroke is called a return stroke.

In this state, when a control signal from the ECU 27 is applied to the solenoid valve mechanism 300, a current flows through the electromagnetic coil 43 via the terminal 46. A magnetic attraction force acts between a magnetic core 39 and an anchor 36, and the magnetic core 39 and the anchor 36 come in contact with each other at the magnetic attraction surface. The magnetic attraction force overcomes the biasing force of the rod biasing spring 40 and urges the anchor 36. The anchor 36 engages with the rod protrusion 35*a*, and moves the rod 35 away from the inlet valve 30.

At this time, the inlet valve 30 is closed by the biasing force of the inlet valve biasing spring 33 and the fluid force caused by the fuel flowing into the suction passage 10*d*. After the valve is closes, the fuel pressure in the pressurizing chamber 11 rises along with the upward motion of the plunger 2, and when the fuel pressure becomes equal to or larger than the pressure in the fuel outlet port 12, high-pressure fuel is discharged through the discharge valve mechanism 8 and is supplied to the common rail 23. This stroke is called a discharge stroke.

That is, the upward stroke from the lower start point to the upper start point of the plunger 2 includes a return stroke and a discharge stroke. Then, by controlling the energization timing of the coil 43 of the solenoid valve mechanism 300, the amount of high-pressure fuel that is discharged can be controlled.

The plunger 2 includes a large-diameter portion 2*a* and a small-diameter portion 2*b*, and the volume of a sub chamber 7*a* increases or decreases as the plunger reciprocates. The sub chamber 7*a* communicates with the damper chambers (10*b*, 10*c*) through a fuel passage 10*e*. When the plunger 2 descends, fuel flows from the sub chamber 7*a* to the damper chambers (10*b*, 10*c*), and when it rises, fuel flows from the damper chambers (10*b*, 10*c*) to the sub chamber 7*a*.

As a result, such a function is provided that the flow rate of fuel into and out of the pump during the intake stroke or the return stroke of the pump can be reduced, and the pressure pulsation generated inside the high-pressure fuel pump is reduced.

As shown in FIG. 3, the discharge valve mechanism 8 provided at the outlet of the pressurizing chamber 11 includes a discharge valve seat 8*a*, a discharge valve 8*b* that contacts and separates from the discharge valve seat 8*a*, a discharge valve spring 8*c* that biases the discharge valve 8*b* toward the discharge valve seat 8*a*, and a discharge valve stopper 8*d* that determines the stroke (movement distance) of the discharge valve 8*b*. The discharge valve stopper 8*d* and the pump body 1 are joined by welding at an abutment portion 8*e* for shutting off between the fuel and the outside.

In a state where there is no fuel differential pressure between the pressurizing chamber 11 and a discharge valve chamber 12*a*, the discharge valve 8*b* is pressure-bonded to the discharge valve seat 8*a* by the biasing force of the discharge valve spring 8*c* and is in a closed state. When the fuel pressure in the pressurizing chamber 11 becomes higher than the fuel pressure in the discharge valve chamber 12*a*, the discharge valve 8*b* opens against the discharge valve spring 8*c*. The high-pressure fuel in the pressurizing chamber 11 is discharged to the common rail 23 through the discharge valve chamber 12*a*, a fuel discharge passage 12*b*, and the fuel outlet port 12. When the discharge valve 8*b* is opened, it comes into contact with the discharge valve stopper 8*d*, and the stroke is limited. Therefore, the stroke of the discharge valve 8*b* is appropriately determined by the discharge valve stopper 8*d*. This prevents such a situation that the fuel that is discharged at high pressure into the discharge valve chamber 12*a* from flowing back into the pressurizing chamber 11 again due to the delay in closing the discharge valve 8*b* caused by the stroke being too large, so that reduction in the efficiency of the high-pressure fuel pump can be suppressed.

When the fuel in the pressurizing chamber 11 is pressurized and the discharge valve 8*b* is opened, the high-pressure fuel in the pressurizing chamber 11 passes through a discharge valve chamber 80 and a fuel discharge passage, and is discharged from the fuel outlet port 12. The fuel outlet port 12 is formed in a discharge joint 60, and the discharge joint 60 is welded and fixed to the pump body 1 by a welding portion to secure a fuel passage.

Next, a relief valve mechanism 200 shown in FIGS. 2 and 3 will be described.

The relief valve mechanism 200 includes a relief body 201, a relief valve 202, a relief valve holder 203, a relief spring 204, and a spring stopper 205. The relief body 201 is provided with a tapered seat portion. The valve 202 is loaded with the load of the relief spring 204 via the valve holder 203 and is pressed against the seat portion of the relief body 201 to block the fuel in cooperation with the seat portion.

When the pressure of the fuel outlet port 12 becomes abnormally high due to a failure of the solenoid intake valve 300 of the high-pressure fuel pump and becomes higher than the set pressure of the relief valve mechanism 200, the abnormal high-pressure fuel is discharged to the damper chamber 10*c* on the low-pressure side via a relief passage 213. In this embodiment, the discharge destination of the relief valve mechanism 200 is a damper chamber 10*b*, but may be the pressurizing chamber 11.

Hereinafter, the discharge valve mechanism 8 in the present embodiment will be described with reference to FIGS. 5 to 8. As shown in FIG. 3, when the discharge valve 8*b* of the discharge valve mechanism 8 is a poppet valve, it is necessary to polish the discharge valve 8*b* after cutting it, so that there is a problem that the number of processing steps increases and the manufacturing cost increases. Further, when the discharge valve mechanism 8 is a unit type, components that are difficult to process are required, and the pump body 1 must be enlarged.

Figure 5:
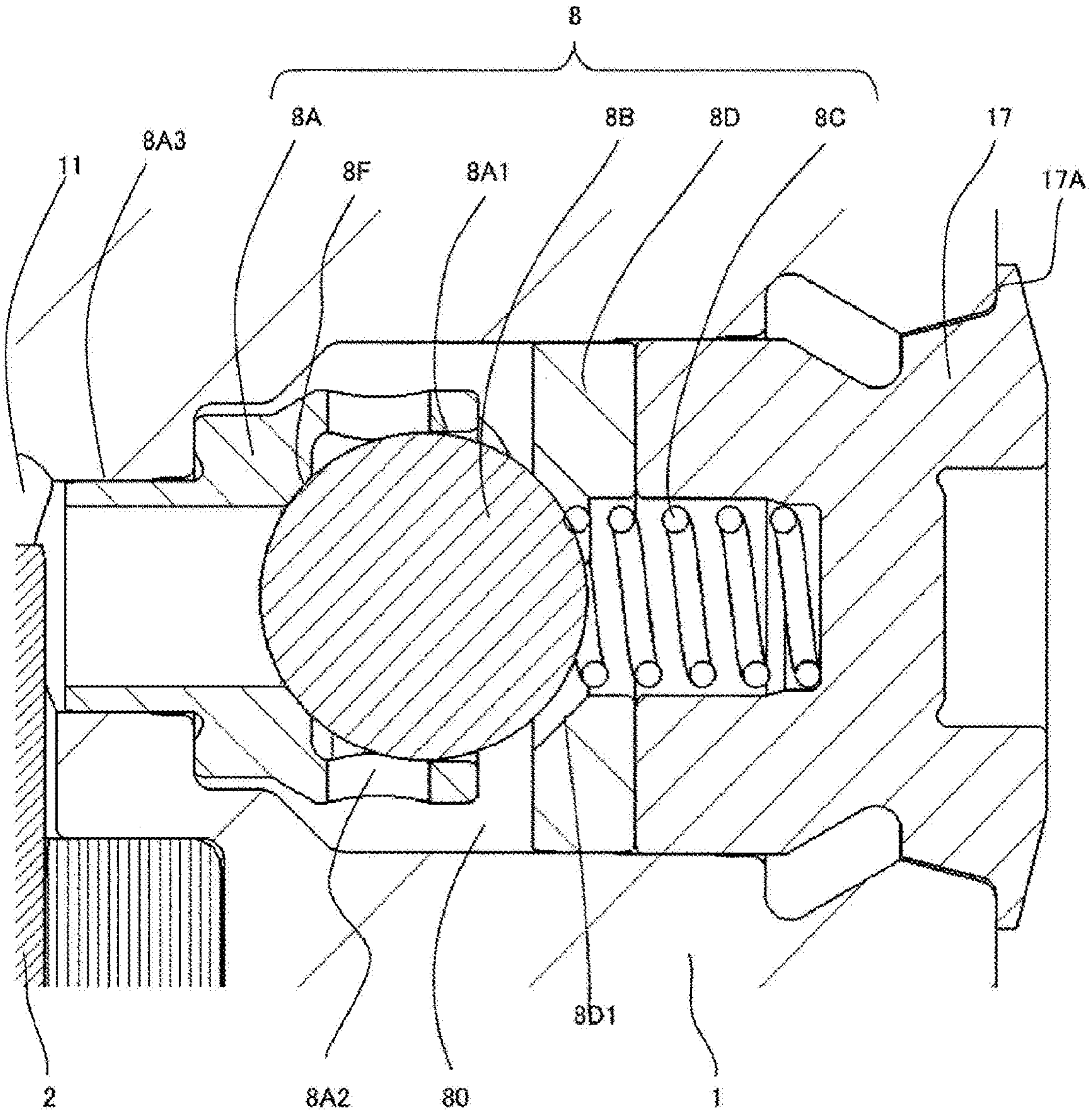
FIG. 5 is a longitudinal sectional view of a discharge valve mechanism of the present embodiment in a closed state.

Therefore, the discharge valve mechanism 8 of the present embodiment will be described with reference to FIGS. 5 and 6. FIG. 5 shows a state in which the discharge valve 8B of the discharge valve mechanism 8 comes in contact with the discharge valve seat 8F of the discharge valve seat member 8A and is closed. Further, FIG. 6 shows a state in which the discharge valve 8B of the discharge valve mechanism 8 is separated from the discharge valve seat 8F of the discharge valve seat member 8A and is opened.

Figure 6:
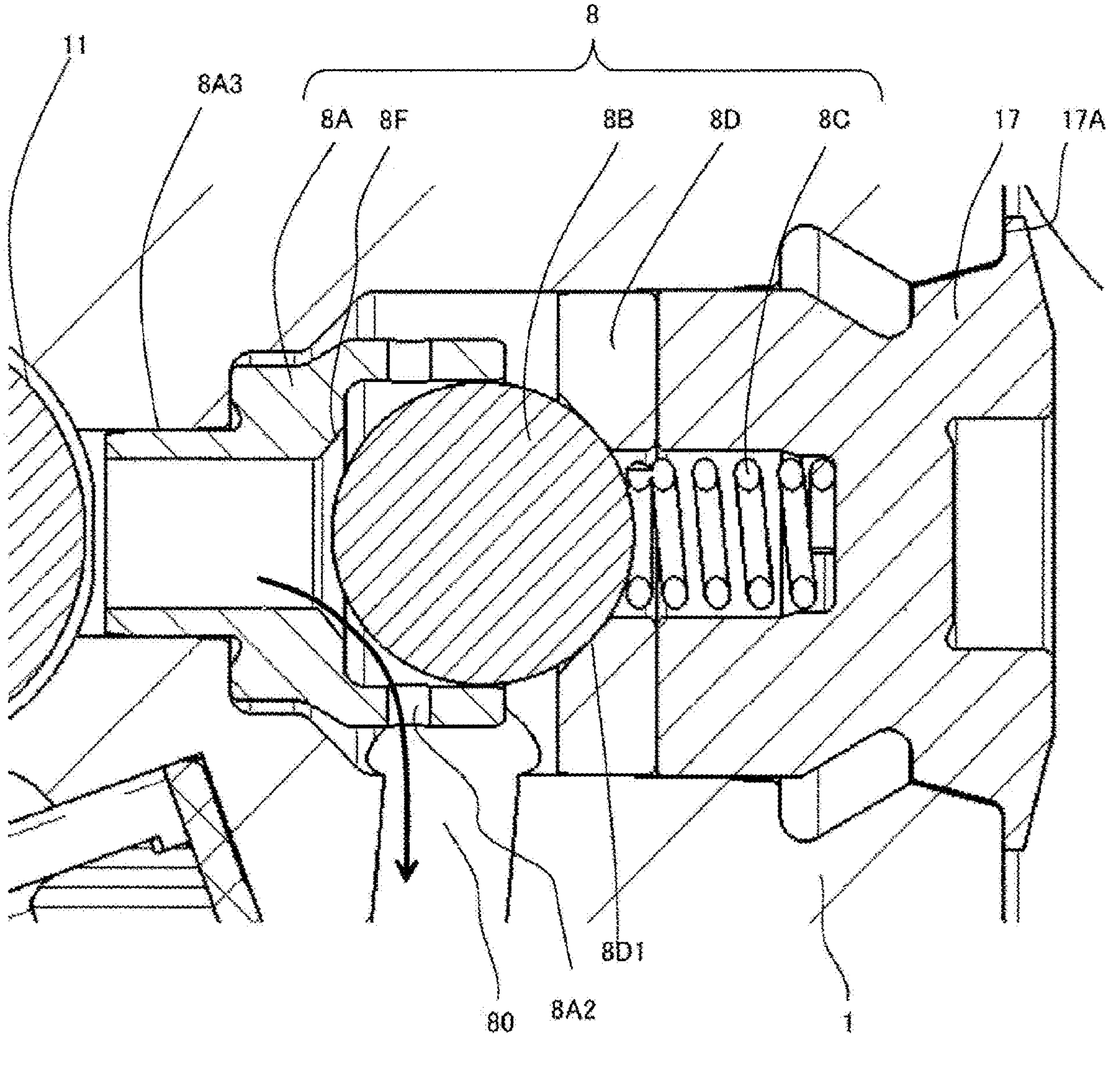
FIG. 6 is a cross-sectional view of the discharge valve mechanism of the present embodiment in an open state.

As shown in FIGS. 5 and 6, the discharge valve mechanism 8 of the present embodiment includes the discharge valve 8B arranged on the discharge side of the pressurizing chamber 11, the discharge valve seat 8F on which the discharge valve 8B is seated, and a facing member 8D (stopper) configured independently as a separate member from the discharge valve seat 8F and located on the opposite side of the discharge valve seat 8F with the discharge valve 8B interposed therebetween. In the discharge valve mechanism 8, a stroke direction regulating portion 8D1 that regulates displacement of the discharge valve 8B in the stroke direction is formed on the tapered surface of the facing member 8D.

According to this configuration, since the stroke direction regulating portion 8D1 is formed on the tapered surface of the facing member 8D, the movement of the discharge valve 8B in the stroke direction can be stably regulated even if the discharge valve 8B is configured by an inexpensive ball valve. Accordingly, it is possible to configure a highly reliable discharge valve mechanism at low cost.

In this embodiment, the discharge valve 8B is configured by a ball valve. According to this configuration, since the discharge valve 8B is configured by an inexpensive ball valve, it is possible to configure the discharge valve mechanism at low cost. In addition, according to this configuration, a high-pressure fuel pump that ensures oil tightness even at high fuel pressure and includes a small and lightweight discharge valve mechanism is provided.

As shown in FIGS. 5 and 6, the discharge valve mechanism includes the discharge valve chamber 80 in which the discharge valve mechanism 8 including the discharge valve 8B and the discharge valve seat 8F is arranged, and the facing member 8D (stopper) is configured separately from a plug member 17 (sealing plug). Specifically, the large-diameter facing member 8D (stopper) is fixed to the small-diameter inner peripheral portion of the pump body 1 by press-fitting. However, the facing member 8D (stopper) may be configured by the plug member 17 (sealing plug) that shields the discharge valve chamber 80 from the outside. According to this configuration, since the facing member 8D (stopper) can be formed integrally with the plug member 17 (sealing plug), the discharge valve mechanism can be configured at low cost.

The discharge valve mechanism 8 includes the valve seat member 8A, the discharge valve 8B that opens and closes the discharge passage 81 by coming into abutment against or separating from the discharge valve seat 8F of the valve seat member 8A, and the discharge valve spring 8C that is attached to the plug member 17 (sealing plug) and urges the discharge valve 8B toward the discharge valve seat 8F. As described above, the stroke direction regulating portion 8D1 that regulates displacement of the discharge valve 8B in the stroke direction is formed on the tapered surface of the facing member 8D. In FIGS. 5 and 6, the facing member 8D and the plug member 17 (sealing plug) are configured separately from each other, but they may be configured integrally.

In this embodiment, the stroke regulating portion 8D is formed on the facing member 8D (plug member 17), but it may be formed on a discharge joint 150. That is, the high-pressure fuel pump of the present embodiment includes the discharge valve chamber 80 in which the discharge valve mechanism 8 including the discharge valve 8B and the discharge valve seat 8F is arranged, and the facing member 8D may be configured by the discharge joint 60 fixed to the pump body 1.

The discharge valve 8B forms an annular contact surface 8F that can keep oil tightness by coming in contact with the discharge valve seat 8F of the discharge valve seat member 8A. Further, the discharge valve spring 8C is attached to the facing member 8D (plug member 17) and urges the discharge valve 8B toward the discharge valve seat 8F, that is, biases the discharge valve 8B in the valve closing direction.

The discharge valve seat member 8A on which the discharge valve seat 8F is formed is formed with a radial direction regulating portion 8A1 that regulates displacement of the discharge valve 8B in the direction perpendicular to the stroke axis. According to this configuration, even when the discharge valve 8B is configured by an inexpensive ball valve, it is possible to regulate displacement of the discharge valve 8B in the direction perpendicular to the stroke axis. Accordingly, it is possible to configure a highly reliable discharge valve mechanism.

It is desirable that the length of the discharge valve radial direction regulating portion 8A1 in the discharge valve axis direction is formed to be approximately half or more of the diameter of the discharge valve 8B. As a result, it is possible to stably regulate the displacement of the discharge valve 8B in the direction perpendicular to the stroke axis, and it is possible to configure a highly reliable discharge valve mechanism.

Further, it is desirable that the length of the radial direction regulating portion 8A1 is larger than the length to the tapered surface of the sealing plug 17 (stroke of the discharge valve member 8B) in the discharge valve axial direction. As a result, it is possible to stably regulate the displacement of the discharge valve 8B in the direction perpendicular to the stroke axis, and it is possible to configure a highly reliable discharge valve mechanism.

A radial direction flow path 8A2 that causes the fuel discharged via the ball valve 8B to flow toward the radially outer side of the discharge valve mechanism 8 is formed in the radial direction regulating portion 8A1 of the discharge valve seat member 8A on which the discharge valve seat 8F is formed. It is desirable that a plurality of radial direction flow paths 8A2 be formed on the outer periphery of the discharge valve seat. If the necessary flow path area of the radial direction flow path 8A2 can be ensured, the shape can be a circle, an ellipse, a long hole, a square, or the like. By forming the plurality of Radial direction flow paths 8A2 on the outer periphery of the discharge valve seat, a necessary flow path can be secured.

Further, the high-pressure fuel pump of the present embodiment includes a press-fitting portion 8A3 in which the discharge valve seat member 8A on which the discharge valve seat 8F is formed is press-fitted into the pump body 1, and a welding portion 17A in which the facing member (sealing plug 17) is welded to the pump body 1, and the valve seat member 8A on which the discharge valve seat is formed and the facing member (sealing plug 17) are configured separately from each other in a non-contact manner.

Figure 7:
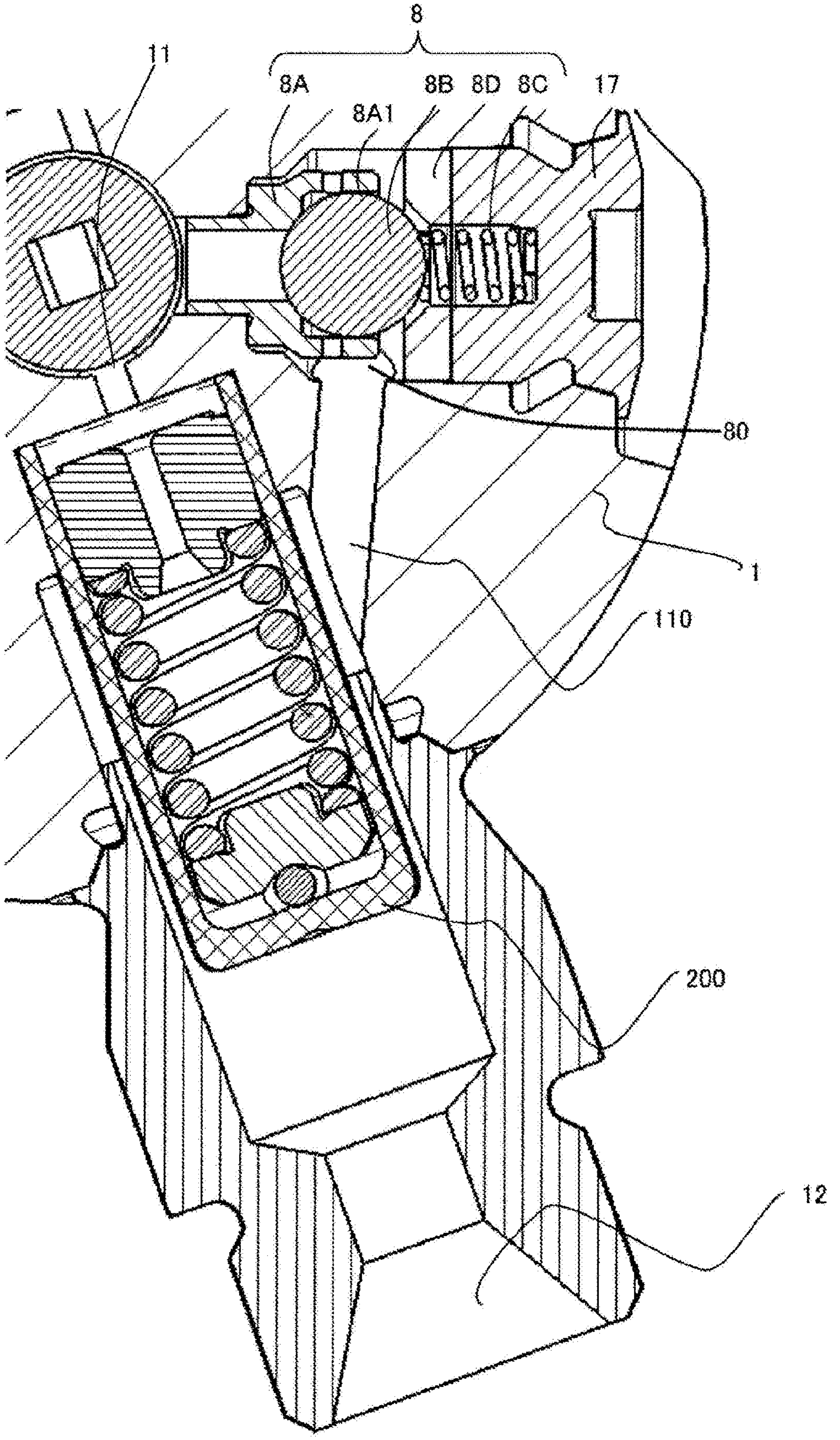
FIG. 7 is a transverse sectional view including the discharge valve mechanism and a pressurizing chamber return relief valve of the present embodiment.
Figure 8:
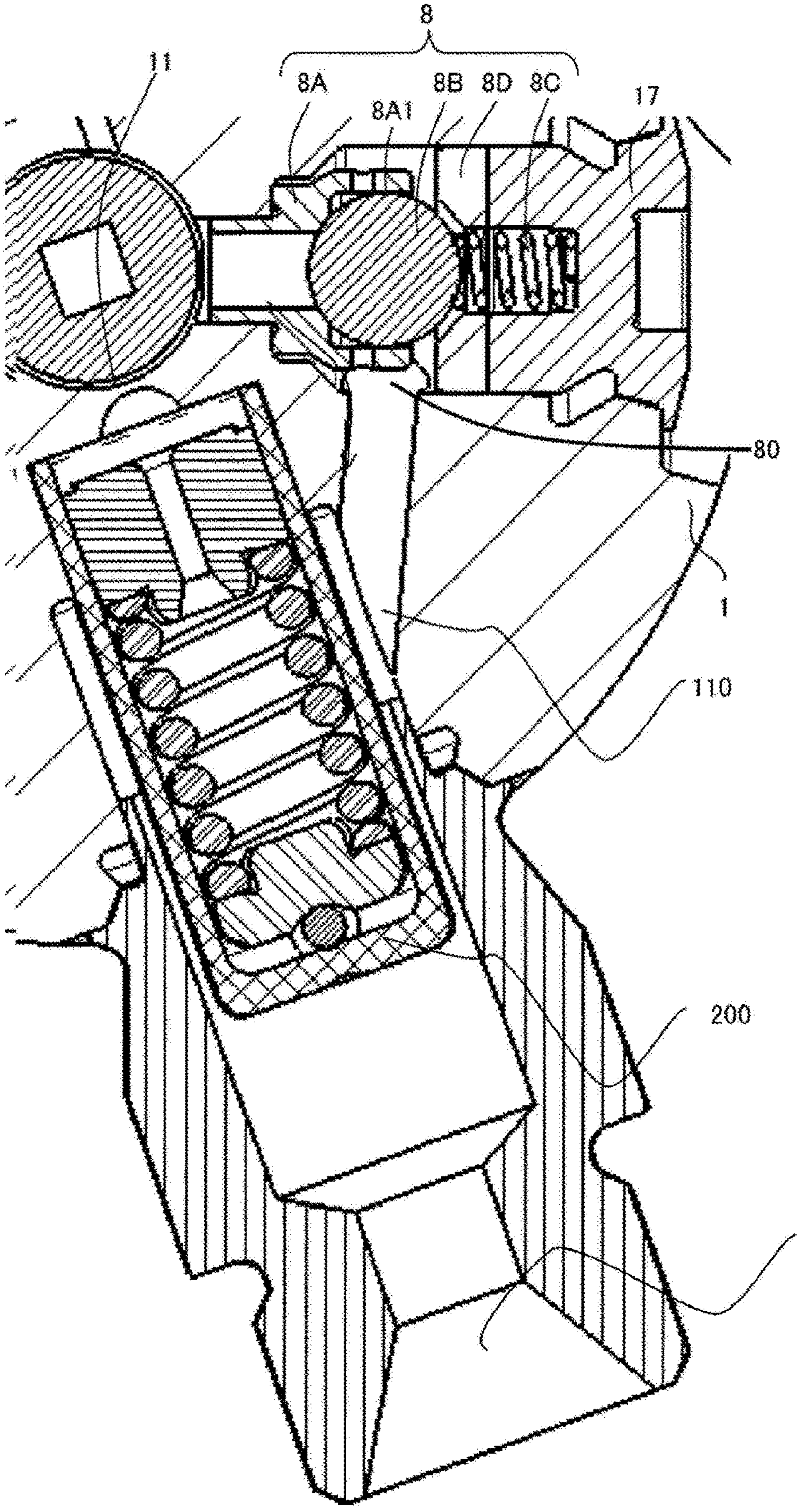
FIG. 8 is a transverse sectional view including the discharge valve mechanism and a low-pressure chamber return relief valve of the present embodiment.

As shown in FIGS. 7 and 8, in the present embodiment, the fuel that has passed through the discharge valve seat member 8A flows from the discharge valve chamber 80 through the communication path 110 to the fuel outlet port 12 and is discharged from the high-pressure fuel pump. In the present embodiment, the relief valve mechanism 200 is arranged at the fuel outlet port 12. The radial direction regulating portion 8A1 may be formed on the sealing plug 17 side. At that time, similarly, the radial direction flow path 8A2 may be formed on the sealing plug 17 side.

The high-pressure fuel pump of the present embodiment includes the relief valve mechanism 200 that returns fuel to the pressurizing chamber 11 or a low-pressure flow path such as a pressure pulsation reduction mechanism 9 or a suction passage 10*d* when the fuel discharged through the discharge valve 8B exceeds the set pressure. The fuel discharged from the pressurizing chamber 11 flows through the discharge valve chamber 80, then flows through the communication path 110 in which the relief valve mechanism 200 is arranged, and is discharged from the fuel outlet port 12.

In the high-pressure fuel pump of the present embodiment, the fuel discharged through the discharge valve 8B flows on the radially outer side of the discharge valve mechanism 8 and through the flow path formed substantially horizontally in the pump body 1 configuring the pressurizing chamber 11, then flows through the relief valve chamber in which the relief valve mechanism 200 is arranged, and is discharged from the fuel outlet port 12.

According to the present embodiment described above, the number of processing steps of the discharge valve 8B can be reduced, the valve body can be manufactured at low cost, and the high-pressure fuel pump itself can be realized without increasing the size. In addition, since the discharge valve 8B has a curved abutment portion, when a high back pressure is applied, the seat portion is slightly deformed by Hertz contact to form a sealing surface, and a high oil tightness can be exhibited. Therefore, a high-pressure fuel pump that ensures oil tightness even at high fuel pressure and has a small and lightweight discharge valve structure can be provided.

REFERENCE SIGNS LIST

1 pump main body
2 plunger
6 cylinder
8 discharge valve mechanism
8A discharge valve seat member
8A1 radial direction regulating portion
8A2 radial direction flow path
8B discharge valve
8D facing member
8D1 stroke direction regulating member
8F discharge valve seat
17 plug member
80 discharge valve chamber
200 relief valve mechanism
300 solenoid intake valve

The invention claimed is:

1. A high-pressure fuel pump comprising:
a discharge valve arranged on a discharge side of a pressurizing chamber;
a discharge valve seat on which the discharge valve is seated;
a facing member configured independently as a separate member from the discharge valve seat and located on an opposite side of the discharge valve seat with the discharge valve interposed therebetween; and
a discharge valve chamber in which a discharge valve mechanism including the discharge valve and the discharge valve seat is arranged, wherein
the facing member is configured by including a discharge valve stopper having a stroke direction regulating portion that regulates displacement of the discharge valve in a stroke direction and a plug member that shields the discharge valve chamber from outside,
the stroke direction regulating portion is formed as a tapered surface,
the discharge valve stopper is configured separately from the plug member,
the discharge valve is configured by a ball valve,
in the discharge valve stopper, an outer peripheral surface of a range overlapping the tapered surface in the stroke direction is press-fitted into the inner peripheral portion of the discharge valve chamber, and
the plug member is welded to a pump body in which the discharge valve chamber is formed.

2. The high-pressure fuel pump according to claim 1, further comprising a discharge valve spring that is attached to the facing member and urges the discharge valve toward the discharge valve seat.

3. The high-pressure fuel pump according to claim 1, wherein a discharge valve seat member, on which the discharge valve seat is formed, is formed with a radial direction regulating portion that regulates displacement of the discharge valve in a direction perpendicular to a stroke axis.

4. The high-pressure fuel pump according to claim 3, wherein a radial direction flow path that causes fuel discharged via the ball valve to flow toward a radially outer side of a discharge valve mechanism is formed in the radial direction regulating portion.

5. The high-pressure fuel pump according to claim 4, wherein a plurality of radial direction flow paths are formed.

6. The high-pressure fuel pump according to claim 3, wherein a length of the radial direction regulating portion in the stroke direction is formed to be approximately half or more of a diameter of the discharge valve.

7. The high-pressure fuel pump according to claim 3, wherein a length of the radial direction regulating portion is larger than a length of the tapered surface of the facing member in the stroke direction.

8. The high-pressure fuel pump according to claim 1, further comprising a relief valve mechanism that returns fuel to the pressurizing chamber or a low-pressure flow path when fuel discharged through the discharge valve exceeds a set pressure,
wherein the fuel discharged from the pressurizing chamber flows through a relief valve chamber, and then flows through a relief valve chamber in which the relief valve mechanism is arranged, and is discharged from a fuel outlet port.

9. The high-pressure fuel pump according to claim 8, wherein the fuel discharged through the discharge valve flows on a radially outer side of the discharge valve mechanism and through a flow path formed substantially horizontally in the pump body configuring the pressurizing chamber, then flows through the relief valve chamber, and is discharged from the fuel outlet port.

10. The high-pressure fuel pump according to claim 1, further comprising:
a discharge valve seat member on which the discharge valve seat is formed;
a press-fitting portion in which the discharge valve seat member on which the discharge valve seat is formed, is press-fitted into the pump body; and
a welding portion in which the plug member configuring the facing member is welded to the pump body, wherein
the discharge valve seat member and the facing member are configured separately from each other in a non-contact manner.

11. The high-pressure fuel pump according to claim 1, further comprising:
a discharge valve spring that biases said discharge valve toward said discharge valve seat, wherein
the discharge valve spring is provided across the stroke direction regulating portion of the facing member and the plug member, and
the discharge valve spring is disposed in a recess provided on a side opposite to the discharge valve seat following the tapered surface in the stroke direction.

* * * * *